(12) United States Patent
Rausch et al.

(10) Patent No.: US 12,486,191 B2
(45) Date of Patent: Dec. 2, 2025

(54) CULLET AND CULLET WATER HANDLING SYSTEM

(71) Applicant: Owens-Brockway Glass Container Inc., Perrysburg, OH (US)

(72) Inventors: Philip J. Rausch, Perrysburg, OH (US); John Holmes-Libbis, Perrysburg, OH (US); Joseph Asmus, Bowling Green, OH (US); Corey Beaber, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 1069 days.

(21) Appl. No.: 17/489,925

(22) Filed: Sep. 30, 2021

(65) Prior Publication Data

US 2022/0098081 A1 Mar. 31, 2022

Related U.S. Application Data

(60) Provisional application No. 63/085,644, filed on Sep. 30, 2020.

(51) Int. Cl.
*C03B 9/44* (2006.01)
*B65G 11/02* (2006.01)
(Continued)

(52) U.S. Cl.
CPC ............. *C03B 9/44* (2013.01); *B65G 11/026* (2013.01); *B65G 19/08* (2013.01); *B65G 51/03* (2013.01);
(Continued)

(58) Field of Classification Search
None
See application file for complete search history.

(56) References Cited

U.S. PATENT DOCUMENTS 1,546,544 A * 7/1925 Kucera ..................... C03B 7/00
65/325
3,266,880 A 8/1966 Pilkington
(Continued)

FOREIGN PATENT DOCUMENTS

CA 1293120 C * 12/1991 ......... B05B 15/1262
CN 10569307 A 6/2016
(Continued)

OTHER PUBLICATIONS

KR 2011-0012081 machine translation, Han Woo Jung, Bio Clean Grease Trap, Feb. 2011 (Year: 2011).*
(Continued)

*Primary Examiner* — Queenie S Dehghan

(57) ABSTRACT

A glassware manufacturing system, waste handling system, and method are disclosed. The glassware manufacturing system, in accordance with one aspect of the disclosure, comprises an architectural installation having a forming floor and no basement beneath the forming floor; a glassware forming machine carried on the forming floor; a molten glass feeder configured to provide molten glass to the glassware forming machine; and a glassware manufacturing waste handling system including a sump pit in the forming floor, and a waste liquid trench substantially surrounding the glassware forming machine and flowing to the sump pit. Also, a cullet material handler and/or a molten waste glass sluice may be configured to receive molten glass and unused molten glass streams from the molten glass feeder and hot glassware rejects from the glassware forming machine.

34 Claims, 10 Drawing Sheets

(51) Int. Cl.
*B65G 19/08* (2006.01)
*B65G 51/03* (2006.01)
*C03B 7/14* (2006.01)
*C03B 25/04* (2006.01)

(52) U.S. Cl.
CPC ............... *C03B 7/14* (2013.01); *C03B 25/04* (2013.01); *B65G 2201/047* (2013.01); *B65G 2207/22* (2013.01); *B65G 2812/0396* (2013.01)

(56) References Cited

U.S. PATENT DOCUMENTS

| | | | |
|---|---|---|---|
| 3,607,195 | A | 9/1971 | Horio et al. |
| 3,732,086 | A | 5/1973 | Heyne |
| 4,549,893 | A | 10/1985 | Hindman et al. |
| 4,639,263 | A * | 1/1987 | Kulikauskas ........... B07C 5/126 700/83 |
| 4,723,977 | A * | 2/1988 | Grant .................. G05B 19/353 65/29.17 |
| 4,986,844 | A | 1/1991 | Fenton |
| 5,032,163 | A | 7/1991 | Balestra |
| 5,069,704 | A | 12/1991 | Boutier et al. |
| 5,620,491 | A | 4/1997 | Puhl et al. |
| 6,120,430 | A | 9/2000 | Hansen et al. |
| 6,212,909 | B1 | 4/2001 | Leidy et al. |
| 7,073,352 | B2 | 7/2006 | Tijerina-Ramos et al. |
| 7,900,476 | B2 | 3/2011 | Lehman et al. |
| 9,834,894 | B1 | 12/2017 | Reed et al. |
| 10,358,358 | B1 * | 7/2019 | Waggoner ............... C02F 1/048 |
| 2013/0126576 | A1 | 5/2013 | Marshall et al. |

FOREIGN PATENT DOCUMENTS

| | | |
|---|---|---|
| CN | 109970350 A | 7/2019 |
| CN | 21184132 U | 8/2020 |
| FR | 2153226 A1 | 5/1973 |
| GB | 2355981 B | 5/2003 |
| JP | 61127627 A | 6/1986 |
| JP | 5424833 B2 | 2/2014 |
| WO | 2004026776 A1 | 4/2004 |

OTHER PUBLICATIONS

JP 2001002442 machine translation, Sawachi et al., Production of alkali silicate cullet crushed piece, Jan. 2001 (Year: 2001).*
CN 204751215 machine translation, Cao J et al., Environment-friendly Material Site, Nov. 2015 (Year: 2015).*
CN 205822408 machine translation, Yan, Zhang, A Car Wash Sewage Collecting System, Dec. 2016 (Year: 2016).*
Colombian Office Action, Application No. NC2023/0005016, Applicant: Owens-Brockway Glass Container Inc., Dated: Jan. 8, 2025.
PCT Int. Search Report and Written Opinion, Int. Serial No. PCT/US2021/052762, Int. Filing Date: Mar. 25, 2022, Applicant: Owens-Brockway Glass Container Inc., Mail date: Mar. 25, 2022.

* cited by examiner

CULLET AND CULLET WATER HANDLING SYSTEM

TECHNICAL FIELD

This patent application discloses systems and methods for glassware manufacturing and, more particularly, a system for handling glassware manufacturing waste.

BACKGROUND

Glass container manufacturing processes can include using a glassware forming machine to shape and form glass containers from molten glass. During the forming process, a stream of the molten glass can be separated into a glass gob, formed into a parison, and shaped into a container. Additionally, the glass gobs, parisons, containers, or pieces thereof may be rejected due to various reasons. These rejected materials, along with streams of molten waste glass, are known as internal cullet and can be recycled to a glass melter to produce molten glass.

BRIEF SUMMARY OF THE DISCLOSURE

The present disclosure embodies a number of aspects that can be implemented separately from or in combination with each other.

A glassware manufacturing system, in accordance with one aspect of the disclosure, comprises an architectural installation having a forming floor and no basement beneath the forming floor; a glassware forming machine carried on the forming floor; a molten glass feeder configured to provide molten glass to the glassware forming machine; and a glassware manufacturing waste handling system, including: a sump pit in the forming floor; a waste liquid trench substantially surrounding the glassware forming machine and flowing to the sump pit; and at least one of a cullet material handler or a molten waste glass sluice, configured to receive molten glass from the molten glass feeder and hot glassware rejects from the glassware forming machine. In some instances, the glassware manufacturing system may include an enclosure over the cullet trench, steam removal ductwork, an annealing lehr, a cold cullet return conveyor, a reject conveyor, a cullet crusher, a molten glass chute, and/or an operator pitch chute.

A glassware manufacturing waste handling system, in accordance with one aspect of the disclosure, comprises a sump pit in a forming floor of an architectural installation, where the architectural installation has no basement beneath the forming floor; a waste liquid trench substantially surrounding a glassware forming machine carried on the forming floor, the waste liquid trench flowing to the sump pit; and at least one of a cullet material handler or a molten waste glass sluice, configured to receive molten glass from a molten glass feeder and hot glassware rejects from the glassware forming machine.

A method for handling glassware manufacturing waste, in accordance with one aspect of the disclosure, comprises providing process water to a glassware forming machine carried by a forming floor, where the process water drains from the glassware forming machine to the forming floor; collecting the process water from the forming floor using a waste liquid trench and a sump pit formed in the forming floor; collecting cullet from the glassware forming machine using at least one of a cullet material handler or a molten waste glass sluice disposed adjacent to the glassware forming machine; and recycling the process water from the sump pit to the glassware forming machine. In some implementations, the method may include treating the process water from the sump pit.

A molten waste glass handling sluice, in accordance with another aspect of the disclosure, extends along a longitudinal axis, and includes a base; a platform carried above the base and including an upper wall having a plurality of apertures to deliver fluid from a location below the upper wall to a location above the upper wall; side walls extending in a direction upwardly away from the upper wall; an upstream inlet to receive hot molten glass; and a downstream outlet to transmit cooled glass.

A method of handling waste molten glass, in accordance with a further aspect of the disclosure, comprises receiving waste molten glass on a cushion of gas on a platform, and conveying the waste molten glass in a downstream direction on the cushion of gas on the platform. This method also may include vibrating the platform to assist with conveying the waste molten glass in the downstream direction, adjusting one or more characteristics of the vibrating to affect a flow of the waste molten glass along the platform, and/or adjusting one or more characteristics of the gas to affect a flow of the waste molten glass along the platform.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

In accordance with at least one aspect of the disclosure, a glassware manufacturing system contains and recycles process water within the system, limits internal cutlet handling to a forming floor, and minimizes the volume and improves the quality of process water, thereby reducing environmental disposal costs and improving safety in a glassware forming area. External cullet arises from post-consumer recycling of glass products. Internal cullet arises from waste glass in a glass factory, including waste gobs or charges of molten glass from a gob or charge feeder spout, or streams of molten glass from a glass melter, a finer, a forehearth, or the gob or charge feeder spout, or hot glassware rejects, or cold glassware rejects.

Conventional glassware forming systems often combine manual or semi-automatic methods for handling glass cullet (e.g., steel hoppers, drag chains into bunkers, fork trucks, and the like) in a basement under glassware forming machines. The forming systems can include a system that allows process water and/or other material to gravity flow through collection pans, pipes, and chutes onto the basement floor and into an API oil-water separator pit. Oils and grease can be skimmed from the collected process water, and the remaining process water can be recycled back into the system. As part of this process, some process water may escape the basement with the cullet and has the potential to be comingled with storm or other water. This requires collection and conveyance of the escaped water back to the basement, where increased water volumes, due to comingling with storm water, can upset the system water balance and result in excess water that must be hauled off for environmental disposal at extra expense.

Consequently, the present disclosure is directed to a glassware manufacturing system, and a glassware manufacturing waste handling system that includes an automated and closed cullet and cullet water handling system. By using the systems and methods disclosed herein, the glassware manufacturing system can be contained within a production building without a basement. Additionally, the cullet, process, and/or shear water can be collected and recycled within the system to minimize cost from environmental disposal, and cullet handling can be limited to the forming floor.

Figure 1:
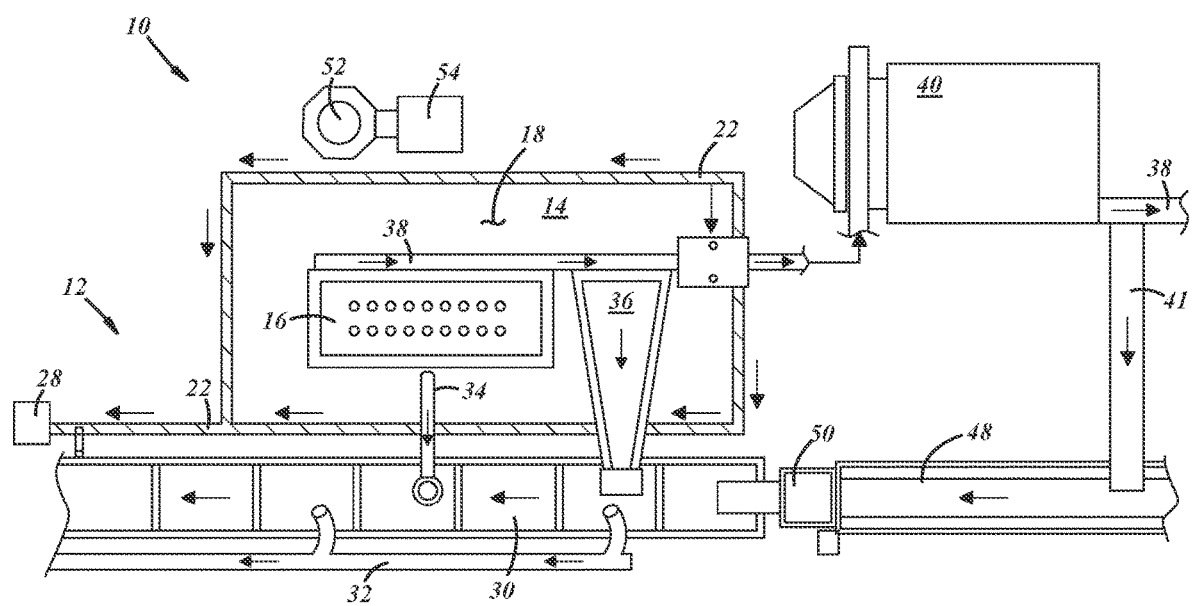
FIG. 1 is a schematic top plan view of a glassware manufacturing system and a glassware manufacturing waste handling system, according to an illustrative embodiment of the present disclosure.
Figures 2, 3:
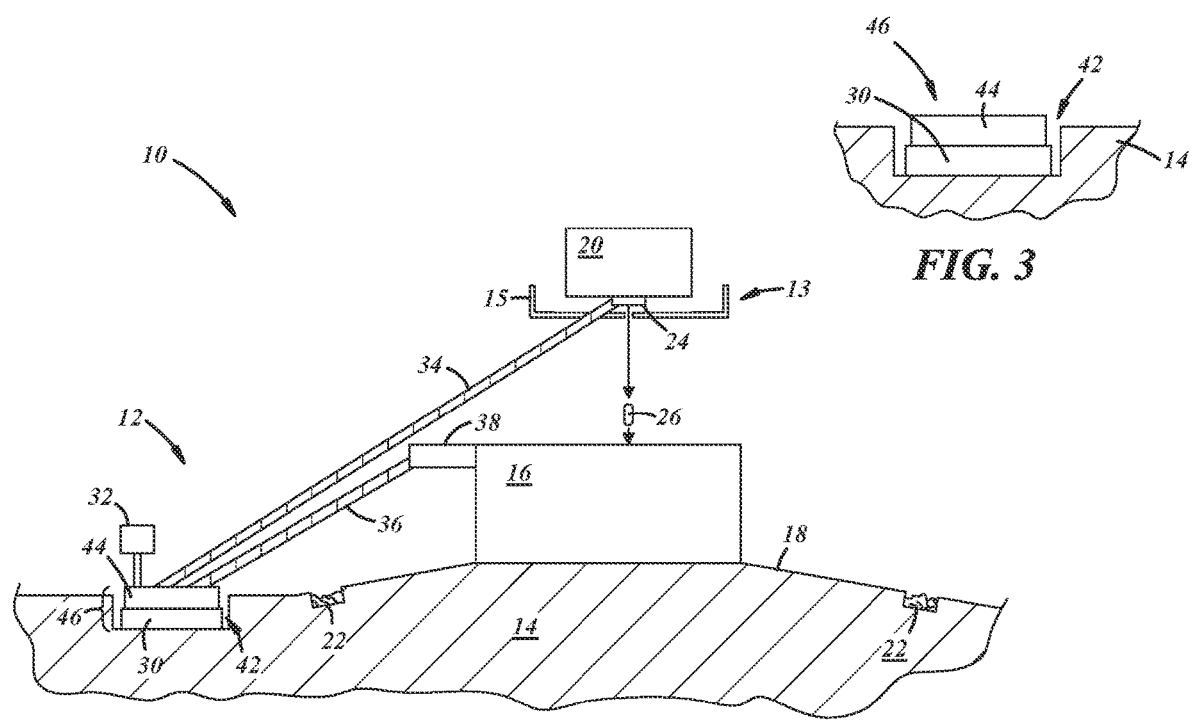
FIG. 2 is a schematic side view of the glassware manufacturing system and glassware manufacturing waste handling system shown in FIG. 1.
FIG. 3 is a schematic cross-sectional view illustrating a cullet material handler, an enclosure, and a cullet trench utilized in the glassware manufacturing system shown in FIG. 1.

Referring generally to FIGS. 1 through 3, a glassware manufacturing system 10 and glassware manufacturing waste handling system 12 are shown in accordance with an illustrative embodiment of the present disclosure. The glassware manufacturing system 10 can comprise an architectural installation 14, a glassware forming machine 16 carried on a forming floor 18 of the installation 14, a glass furnace forehearth 20, and a glassware manufacturing waste handling system 12. Although not shown, the system 10 also may include a submerged combustion melting (SCM) furnace or "melter" and a molten glass finer between the melter and the forehearth 20.

Additionally, the architectural installation 14 can include a concrete foundation establishing the forming floor 18. The architectural installation 14 may also include a factory building (not shown) on the foundation including walls, a roof, and/or an upper level or raised platform above the forming floor 18. The architectural installation 14 can be configured to support and shelter a compact, single-level glassware manufacturing system 10. For example, the architectural installation 14 can be configured to carry glassware forming equipment.

In the embodiment shown in FIGS. 1 and 2, the architectural installation 14 has no basement beneath the forming floor 18 as utilized in conventional systems. In conventional glassware forming systems, a basement is required because traditional cullet chutes use large amounts of high pressure water to keep the steel chutes cool and maintain the flow of rejected or streaming glass into a basement, where the water and cullet are collected. Generally, the level of the water and cullet collecting equipment has been at least one full level below a forming machine. However, utilizing a basement may be less efficient compared to implementing the glassware manufacturing system 10 disclosed herein because using the glassware manufacturing system 10 can reduce the amount of capital investment needed, allow for reductions in process equipment labor requirements, and increase up-time across the glassware forming process. As used herein, the term "basement" includes the lowest habitable level of the glass factory below a forming floor of the factory and can include a first level or a below grade or below ground level portion that may require excavation of earthen material. In contrast, according to the present disclosure, no basement is required, such that the architectural installation 14 includes a concrete slab with earthen material directly underneath the slab, wherein the slab establishes the forming floor 18.

In some embodiments, and with reference to FIG. 2, the forming floor 18 can be sloped to direct process water and/or other liquids on the forming floor 18 away from process equipment. In the context of this disclosure, process water may include shear spray water, cooling water, cullet water, quench water, and the like. For example, the forming floor 18 can be sloped away from a glassware forming machine 16 to a waste liquid trench 22. The forming floor 18 can be sloped or crowned such that liquid efficiently flows but does not create a safety hazard within the glassware manufacturing system 10. It is contemplated that the forming floor 18 may be sloped or crowned just enough to facilitate runoff of liquids, like water, lubricants, or the like.

With continued reference to FIG. 2, the glassware manufacturing system 10 can include the glassware forming machine 16 carried on the forming floor 18. The glassware forming machine 16 can include a machine that holds and moves molten glass, often in the form of a glass gob, and shapes the molten glass to form glassware (e.g., containers). In one example, the glassware forming machine 16 may include an individual section (IS) machine comprising a bank of identical sections, each of which contains a complete set of equipment to form a glass container. The sections may be in a row and may be fed molten glass from a forehearth and moving chutes. The glassware forming machine 16 can be completely housed by the architectural installation 14. It will be appreciated that other types of forming machines may be used in the glassware manufacturing system 10.

The glassware manufacturing system 10 can include a glass furnace forehearth 20 having a molten glass feeder 24 configured to provide molten glass 26 to the glassware forming machine 16. The glass furnace forehearth 20 can be located downstream of a melting furnace (not shown) and may be part of a hot-end subsystem. The glass furnace forehearth 20 can receive molten glass from the furnace and cool the molten glass to a uniform temperature and viscosity suitable for downstream forming operations.

With continued reference to FIG. 2, the molten glass feeder 24 can be located at a downstream end of the glass furnace forehearth 20 and is configured to produce molten glass portions. In the illustrated embodiment, the molten glass feeder 24 can receive the molten glass from the glass furnace forehearth 20, produce a continuous stream of molten glass, and separate the stream into discrete glass gobs that freefall into gob handling equipment (not shown), which may include a series of distributors, scoops, chutes, deflectors, and funnels. The gob handling equipment may also include ancillary lubrication equipment to apply lubricants to the gob handling equipment and liquid separators to separate or otherwise process the lubricants. The molten glass feeder 24 and gob handling equipment can be configured to provide glass gobs to the glassware forming machine 16.

In another embodiment, not presently illustrated, the molten glass feeder 24 can receive the molten glass from the glass furnace forehearth 20, produce a continuous stream of molten glass that that is fed downwardly into a molten glass transport cup and thereafter severed to produce a discrete portion of molten glass carried in the cup and separated from the molten glass stream. In this embodiment, the glass-filled cup is thereafter moved to the glassware forming machine 16, over a mold, and either inverted to dump the glass in the mold, split open to dump the glass in the mold, or opened at an openable bottom end to dump the glass in the mold.

In a further embodiment, not presently illustrated, the molten glass feeder 24 can receive the molten glass from the glass furnace forehearth 20, produce a continuous stream of molten glass that is directly injected into an inverted mold, and then severed to produce a discrete portion of molten glass carried in the cup and separated from the molten glass stream. In this embodiment, no gob handling equipment and no molten glass cup are used; instead, the molten glass is delivered directly into the mold.

Accordingly, the terminology "molten glass portion" includes a molten glass gob, gather, stream, chunk, charge, mold charge, and the like. In one example, a molten glass portion may include a molten glass gob cut from a stream of molten glass produced by a gob feeder and then dropped into gob handling equipment, a transport cup, or a mold. In other examples, a molten glass portion may include a stream of molten glass delivered from an upstream continuous supply of molten glass, and thereafter separated from the upstream continuous supply of molten glass in any suitable manner.

Additionally, and with reference to FIGS. 1 and 2, the glassware manufacturing system 10 can include the glassware manufacturing waste handling system 12, which can further include a shear spray collection system 13 (FIG. 1), a sump pit 28 (FIG. 2), the waste liquid trench 22, and a cullet material handler 30. The glassware manufacturing waste handling system 12 can be used to remove, handle, and/or recycle process liquid, for example, water, oil, and other materials, used during forming processes, and for removing cullet and glassware rejects.

As illustrated in FIG. 1, the glassware manufacturing waste handling system 12 can include the sump pit 28 in the forming floor 18. The sump pit 28 can include a pit or lowest-most volume in the forming floor 18 for collecting the process water and other liquid resulting from the forming process. When the forming floor 18 is sloped or crowned, the sump pit 28 can be located at a low portion of the forming floor 18 so that the liquid can generally flow from the glassware forming machine 16 and equipment to the sump pit 28. The sump pit 28 may include means, for example a pump (not shown), for further transferring the liquid for treatment and/or other handling. For example, the liquid waste in the sump pit 28 can be transferred for treatment, for example, using a pump, and then can be recycled. In some instances, the sump pit 28 may include an oil-water separator (e.g., an API oil-water separator) and/or other treatment means. In this way, the glassware manufacturing system 10 can include a closed or open recirculating loop for treating and/or recycling the process water and other liquid, which can contribute to reducing human intervention in the forming process and potential negative environmental impact while improving safety and process stability.

The glassware manufacturing waste handling system 12 can include a waste liquid trench 22 substantially surrounding the glassware forming machine 16 and flowing to the sump pit 28. As used herein, the phrase "substantially surround" means extending between 240 and 360 angular degrees around including all ranges, sub-ranges, and values including endpoints of that range. The waste liquid trench 22 can be carried by and integrally formed in the forming floor 18. When the forming floor 18 is sloped, the liquid can fall onto the forming floor 18 from the glassware forming machine 16, flow down the sloped forming floor 18 to the waste liquid trench 22, and flow through the waste liquid trench 22 to the sump pit 28. In FIG. 1, the waste liquid trench 22 forms a rectangle and completely surrounds the glassware forming machine 16. It will be appreciated that the waste liquid trench 22 may include other configurations and may include more than one trench that flows to the sump pit 28. For example, the waste liquid trench 22 may also substantially surround and/or be located adjacent to other equipment within the glassware manufacturing system 10, for example steam removal ductwork 32.

Shown in FIG. 1, the glassware manufacturing waste handling system 12 can include the cullet material handler 30 configured to receive discrete molten glass portions and unused molten glass streams from the molten glass feeder 24. Although not illustrated, the handler 30 also may be configured to receive molten glass streams from the SCM furnace and/or the finer when it is desired to drain or "dump" molten glass therefrom, for example, to accommodate a glass color changeover, equipment maintenance, equipment relocation, or the like. Any suitable conduit, sluice, or the like may be used to communicate drains, outlets, or the like of the SCM furnace and/or the finer to the handler 30. The handler 30 is also configured to receive hot glassware rejects from the glassware forming machine 16, cold glassware rejects from a cold cullet return conveyor 48, and the like. The cullet material handler 30 may include a cullet drag chain, which may include a chain conveyor comprising a continuous chain arrangement with a series of single pendants, where the chain arrangement can be driven by a motor to convey the rejected molten glass portions, the unused molten glass streams, the cold glassware rejects, and/or the hot glassware rejects. In an example, the cullet drag chain can include a stainless steel hinged drag chain that is suitable for exposure to heat and a humid environment. It is contemplated that the cullet material handler 30 can include other types of conveyors configured to handle hot glass and glass cullet, for example a belt conveyor, a pneumatic conveyor, and/or any other type of material handler suitable for use in moving cullet.

In the illustrated example of FIG. 2, as the molten glass feeder 24 distributes glass gobs to the glassware forming machine 16, some of the glass gobs may be rejected due to commercial variations. At least some of the rejected glass gobs may be transferred from the molten glass feeder 24 and/or the glassware forming machine 16 to the cullet material handler 30 by way of a waste molten glass chute 34. The waste molten glass chute 34 may include a chute or sloping channel or enclosure through which rejected mold charges can fall and be directed to the cullet material handler 30. The waste molten glass chute 34 may include material suitable for handling high temperatures and/or corrosion. In some instances, the waste molten glass chute 34 may be enclosed and/or cooled.

Additionally, and with reference to FIG. 2, as the glassware forming machine 16 forms the glassware, some of the hot glassware may be rejected due to commercial variations. A reject conveyor 36 can be configured to transport hot glassware rejects from the glassware forming machine 16 and/or a glassware conveyor 38 to the cullet material handler 30. The reject conveyor 36 can be located downstream from the glassware forming machine 16 and upstream from an annealing lehr 40. The reject conveyor 36 may include a belt conveyor, a chain conveyor, and the like. In some instances, the reject conveyor 36 may be covered and/or enclosed for containing the cullet to the reject conveyor 36. Additionally, the reject conveyor 36 may include an air assist plate and/or may include high temperature plating. When glassware from the glassware forming machine 16 is rejected, the rejected glassware can be blown from the glassware conveyor 38 and to the reject conveyor 36 upstream from the annealing lehr 40.

A cullet trench 42 may be formed integrally and within the forming floor 18 and may be located proximate to the glassware forming machine 16. As used herein, the term "proximate" means between two inches and twenty feet including all ranges, sub-ranges, endpoints, and values of that range. In specific examples, the cullet material handler 30 can be partially recessed in the cutlet trench 42 or can be fully recessed in the cullet trench 42. Placing the cullet material handler 30 at least partially recessed in a cullet trench 42 can improve access and safety around the glassware forming machine 16. In some instances, the cullet material handler 30 may be mounted to and disposed at or above a level of the forming floor 18.

With reference to FIG. 3, the cullet material handler 30 can include an enclosure 44 over the cullet trench 42 to establish a cullet trench conduit 46. The enclosure 44 can include a cover (e.g., stainless steel cover) that covers at least the top portion of the cullet material handler 30 and can be configured to contain glass cullet to the cullet material handler 30 and contain steam within the cullet trench conduit 46. The steam may be produced from water-cooling jackets, evaporated process water, and from other forming processes.

With reference to FIGS. 1 and 2, steam removal ductwork 32 can be in fluid communication with the cullet trench conduit 46 to remove the steam from the cullet trench conduit 46. The steam removal ductwork 32 can include ducting (e.g., stainless steel sheet metal and the like) and/or other conduit that couples to the enclosure 44 and/or steam removal fans (not shown) for moving the steam and/or other gases from the cullet trench conduit 46 to outside the glassware manufacturing system 10. It will be appreciated that the steam removal ductwork 32 can include other materials that may be suitable for high-temperature and/or corrosive environments. Removing the steam can serve to improve system safety by improving visibility.

With reference to FIG. 2, the shear spray collection system 13 can include a shear spray collector 15 under the feeder 24 to collect shear spray water. In one embodiment, the shear spray collector 15 may include a funnel, tray, or pan that may be in fluid communication with the cullet trench, for example, via the mold charge chute. In another embodiment, the shear spray collection system 13 may be independent from the cullet quench water collection equipment such that shear spray water can be processed and recycled independently of the cullet quench water.

In some implementations, and with reference to FIG. 1, an annealing lehr 40 can be disposed downstream of the glassware forming machine 16 and can be configured for annealing glassware formed by the glassware forming machine 16. The annealing lehr 40 can include a gas-fired oven where the glassware conveyor 38 transports glassware from the glassware forming machine 16 and extends longitudinally through the oven. Additionally, a pusher (not shown) can be configured to push long, transversely extending rows of glassware into the annealing lehr 40.

The glassware manufacturing system 10 can include a cold cullet return conveyor 48 configured to receive cold glassware rejects and cullet from the glassware conveyor 38 and/or a lehr reject conveyor 41 at a location downstream from the annealing lehr 40. The lehr reject conveyor 41 and/or the cold cullet return conveyor 48 may include a belt conveyor, a chain conveyor, and/or another type of conveyor suitable for conveying the cold glassware rejects and cullet to the cullet material handler 30.

The glassware manufacturing system 10 may include a cullet crusher 50 on the forming floor 18 and disposed between the cullet material handler 30 and the cold cullet return conveyor 48. The cullet crusher 50 can be configured to crush and further break rejected glassware and cullet received from the cold cullet return conveyor 48 and can direct the resulting cullet to the cullet material handler 30. The cullet crusher 50 can include, for example, a high speed rotor with wear resistant tips and a crushing chamber, which the rejected glassware can be thrown against. It is contemplated that other types of cullet crushers may be used in the glassware manufacturing system 10, for example, a cylinder/piston impact crusher, hammer mill, rotating breaker bars, rotating drum and breaker plate, or the like.

In some implementations, the glassware manufacturing system 10 may include an operator pitch chute 52 with bottle crushing equipment 54 configured to receive hot glassware rejects from the glassware forming machine 16. The operator pitch chute 52 and/or the bottle crushing equipment 54 can be disposed adjacent, or proximate, to the glassware forming machine 16. Glassware rejected by an operator can be placed into the operator pitch chute 52 and crushed by the bottle crushing equipment 54. The bottle crushing equipment 54 may include a bottle or cullet crusher, and the resulting cullet can be recycled. Similar to the cullet crusher 50, the bottle crushing equipment 54 may include a high speed rotor and a crushing chamber for crushing the rejected glassware to form glass cullet, and/or any other suitable crushers.

Figure 4:
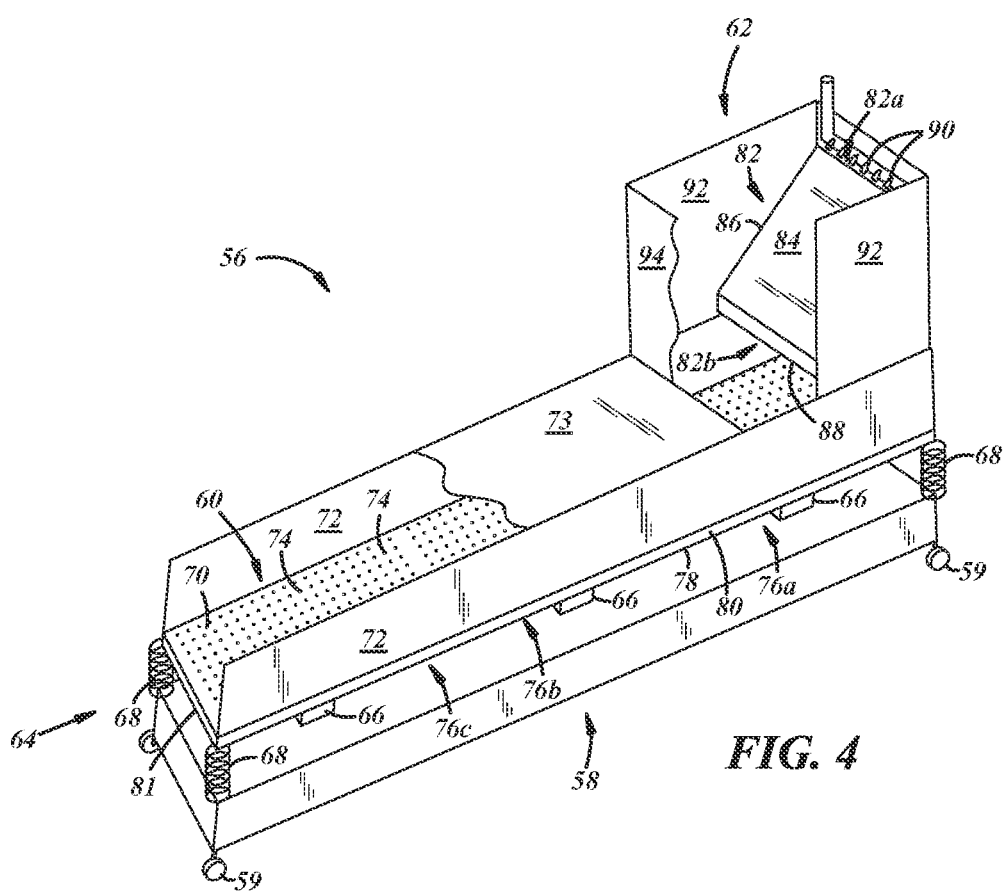
FIG. 4 is a schematic, fragmentary, isometric view of a waste glass handling sluice according to an illustrative embodiment of the present disclosure.

With reference to FIG. 4, a waste glass handling sluice 56 is provided to receive molten glass gobs and/or streams at an upstream location, and cool and convey such molten glass to a downstream location, for example, in solidified form. In one example, hot molten glass may be received at a temperature in the range of 1300 to 1100 degrees Celsius and may be conveyed at a temperature in the range of 1100 to 600 degrees Celsius, and may be discharged from the equipment at a temperature in the range of 600 to 450 degrees Celsius.

In the illustrated embodiment, the sluice 56 is configured to be carried on an upper surface of a forming floor or in a shallow trench in the upper surface of the forming floor. Therefore, the location of the sluice 56 represents a significant departure from conventional arrangements wherein waste molten glass is conveyed down through a forming floor and into a water tank in a basement beneath the forming floor. Nonetheless, in other embodiments, the sluice 56 could be located in the basement of a conventional glass factory architectural installation. In any case, the construction and arrangement of the sluice 56 represents a significant departure from conventional waste molten glass quenching tanks, as described below.

The sluice 56 extends along a longitudinal axis, and includes a base 58 configured to be carried on or by a forming floor of an architectural installation, and a table or platform 60 carried above the base and configured to convey waste glass from an upstream location to a downstream location. The sluice 56 also includes an upstream inlet 62 to receive hot molten glass, and a downstream outlet 64 to transmit cooled, preferably solidified, glass. The sluice 56 also may include vibrators 66 operatively coupled to the platform 60 to vibrate the platform 60 for assisting with moving waste glass in a downstream direction, and vibration isolators 68 operatively coupled between the base 58 and the platform 60 to reduce transmission of vibrations outside of the sluice 56.

The base 58 may include a rectangular frame, as illustrated, and may be fastened or otherwise coupled directly to the forming floor. In other embodiments, the base 58 may include four or more pedestals; one at each corner of the sluice platform. In any embodiment, the base 58 may be adjustable to adjust an angle of declination of the platform 60. For example, the base 58 may include adjustable legs 59, which may include feet, rollers, wheels, or the like, between the forming floor on the one hand and corners of the frame or the pedestals on the other, to raise or lower one or more corners of the sluice platform 60.

The platform 60 includes an upper wall 70 to support, distribute, and convey glass in a downstream direction, and side walls 72 extending in a direction upwardly away from the upper wall 70 to guide and retain glass along and on the upper wall 70. The platform 60 also may include a cover 73 extending between the side walls 72 and spaced above the platform 60, and also the steam removal ductwork and related equipment described above with respect to FIGS. 1 and 2. The upper wall 70 has a plurality of apertures 74 to allow fluid to flow therethrough from a location below the upper wall 70 to a location above the upper wall 70. The apertures 74 may be straight cylindrical in shape, tapered with larger upper ends, chamfered at upper ends, or provided in any other suitable configuration.

The platform 60 also includes one or more fluid ducts 76a,b,c beneath the upper wall 70 of the platform 60 to communicate fluid to the plurality of apertures 74. In the illustrated embodiment, the fluid duct(s) 76a,b,c may be constituted by a space between the upper wall 70, a lower wall 78 beneath the upper wall 70, and side walls 80 and end walls 81 extending therebetween. In other embodiments, the fluid duct(s) 76a,b,c may be constituted from V-shaped lower trough connected to the upper wall, and/or any other configuration suitable for use with an apparatus that conveys molten glass. The plurality of fluid ducts 76a,b,c beneath the upper wall 70 of the platform 60 can communicate fluid to the plurality of apertures 74 according to a plurality of different parameter values. For example, an upstream fluid duct 76a may be supplied with a fluid at a first pressure and flow rate, a downstream fluid duct 76c may be supplied with a fluid at a second pressure and flow rate, and soon. Likewise, in this regard, the apertures 74 corresponding to any given fluid duct of the plurality of fluid ducts may be different in quantity and/or size to convey fluid according to different parameter values. The fluid may be a gas or a liquid, for example, air or water, but can be any fluid suitable for use in cooling and/or conveying glass.

The upstream inlet 62 includes a deflector panel 82 having an upstream end 82a and a downstream end 82b at a lower elevation than the upstream end 82a such that the deflector panel 82 is declined at an oblique angle with respect to horizontal. The deflector panel 82 may be a fluid-cooled panel including a molten glass contact wall 84 to receive molten glass and convey the molten glass downwardly toward the upper wall 70 of the platform 60. The deflector panel 82 also may include a plurality of other walls including side walls 86 and a lower wall 88 to define an internal fluid chamber between the walls, and a fluid inlet and a fluid outlet to receive cooled fluid into the fluid chamber and transmit warmed fluid out of the fluid chamber. The internal fluid chamber may include a serpentine fluid passage between the fluid inlet and the fluid outlet. The upstream inlet also may include a plurality of compressed air nozzles 90 directed toward the molten glass contact wall 84 of the deflector panel 82 to provide external cooling to the deflector panel 82. The upstream inlet 62 also includes inlet side walls 92 on opposite sides of the deflector panel 82 and an inlet front wall 94 extending between the side walls 92 and spaced downstream of the downstream end of the deflector panel 82.

The vibrators 66 may be mounted to a lower surface of the platform 60, or to any other portions of the platform 60 suitable to impart vibrations to the platform 60 to facilitate conveyance of molten glass in a downstream direction along the sluice 56. The vibrators 66 may include pneumatic vibrators, hydraulic vibrators, electric vibrators, and/or any other vibrator types suitable to facilitate conveyance of molten glass in a downstream direction along the sluice 56.

The vibration isolators 68 may be coupled to a lower surface of the base 58, or to any other portions of the base 58 suitable to promote confine the vibrations from the vibrators 66 to the platform 60. The vibration isolators 68 may include coil springs, leaf springs, shock absorbers, hydraulic dampeners, viscoelastic components, and/or any other devices suitable to promote isolation of the vibrations from the vibrators 66 to the platform 60.

With reference to FIGS. 1 and 2, and although not specifically illustrated in FIGS. 1 and 2, the sluice 56 of FIG. 4 may be positioned between the waste liquid trench 22 and the cullet trench 42, alongside the cullet trench 42. In another embodiment, the sluice 56 may be positioned alongside the cullet trench 42 on a side of the cullet trench 42 opposite that of the waste liquid trench 22. In a further embodiment, the sluice 56 may be positioned above and parallel to the cullet trench 42. In an additional embodiment, the sluice 56 may replace the cullet trench 42. In any embodiment, the waste molten glass chute 34 is positioned such that its downstream outlet transmits molten glass to the upstream inlet 62 of the sluice 56 and, more particularly, to the deflector 82 of the sluice 56.

FIGS. 5-14 illustrate another illustrative embodiment of a waste glass handling sluice 156. This embodiment is similar in many respects to the embodiment of FIG. 4 and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

Figure 5:
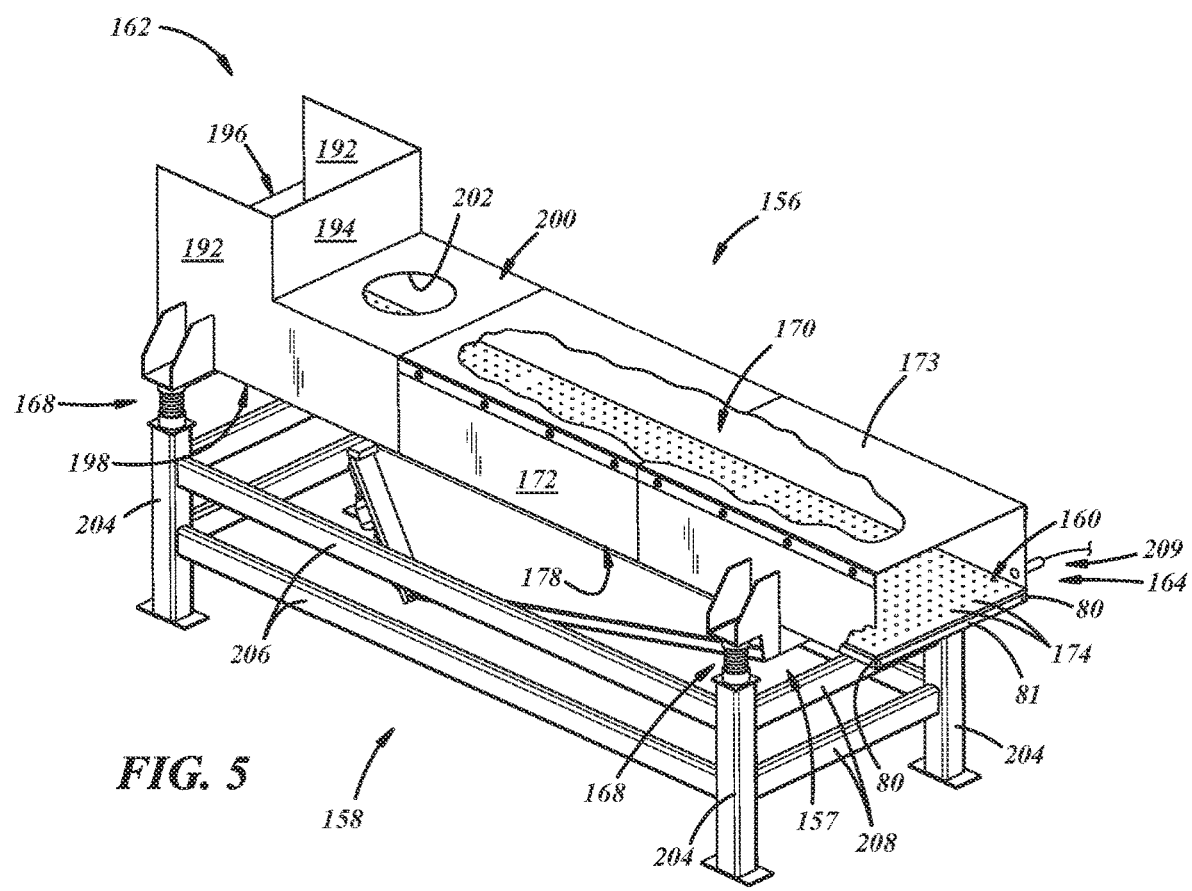
FIG. 5 is a schematic, fragmentary, isometric view of another waste glass handling sluice according to another illustrative embodiment of the present disclosure, wherein the sluice is carried by a cradle on a platform.

With reference to FIG. 5, the sluice 156 is elongate or oblong and extends along a longitudinal axis, and includes a base 158 configured to be carried on or by a forming floor of an architectural installation. The sluice 156 also includes a platform 160 carried above the base 158 and configured to convey waste glass from an upstream location to a downstream location, and also includes an upstream inlet 162 to receive hot molten glass, and a downstream outlet 164 to transmit cooled, preferably solidified, glass. As will be discussed in more detail below, the sluice 156 also may include one or more vibrators 166 (FIG. 11) operatively coupled to the platform 160 to vibrate the platform 160 for assisting with moving waste glass in a downstream direction, and vibration isolators 168 operatively coupled between the base 158 and the platform 160 to reduce transmission of vibrations outside of the sluice 156.

Figure 6:
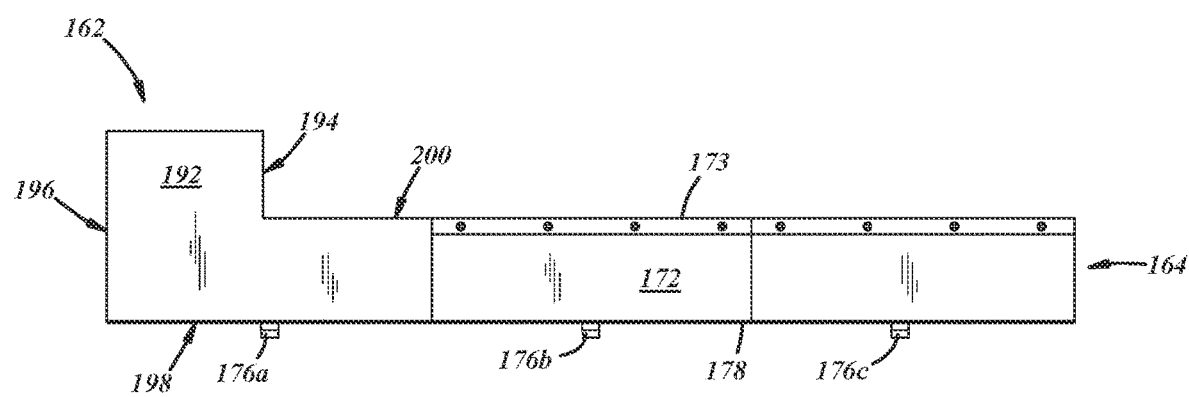
FIG. 6 is a side view of the sluice of FIG. 5.
Figure 7:
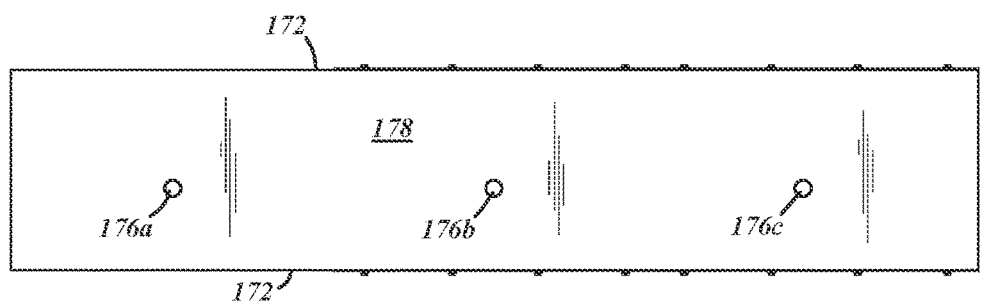
FIG. 7 is a bottom view of the sluice of FIG. 5.
Figure 8:
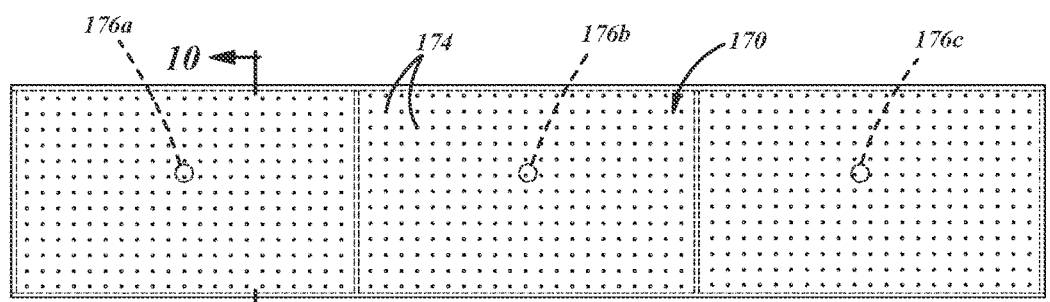
FIG. 8 is a top view of a platform of the sluice of FIG. 5.

With continued reference to FIG. 5, the platform 160 includes an upper wall 170 to support, distribute, and convey glass in a downstream direction, and side walls 172 extending in a direction upwardly away from the upper wall 170 to guide and retain glass along and on the upper wall 170. The platform 160 also may include a cover 173 extending between the side walls 172 and spaced above the platform 160. The upper wall 170 has a plurality of apertures 174 to allow fluid to flow therethrough from a location below the upper wall 170 to a location above the upper wall 170. The apertures 174 convey fluid so as to cool and levitate molten glass and prevent adhesion of the molten glass to the upper wall 170 of the platform 160. The apertures 174 may facilitate provision of a cushion of gas on which the molten glass may be carried, and may include gas supplied on the platform at any pressure suitable to produce that cushion. It is also contemplated that gas pressure might not be applied and that the sluice 156 still may operate to one degree or another. Therefore, gas pressure may be applied through the apertures 174, for example, from 0 to 4 PSI including all ranges, sub-ranges, values, and endpoints of that range. With reference now to FIG. 6, the platform 160 also includes one or more fluid ducts 176a,b,c coupled to a lower wall 178 of the platform 160 to communicate fluid to the plurality of apertures 174.

Figure 9:
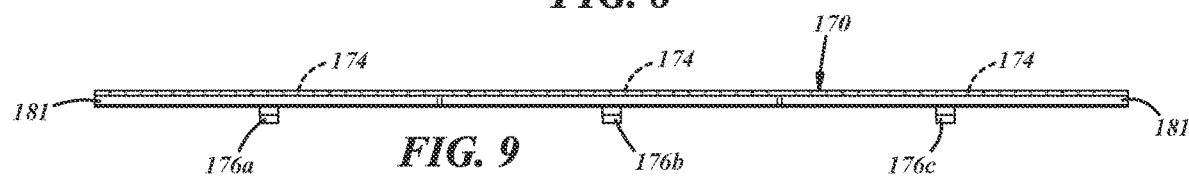
FIG. 9 is a side view of the platform shown in FIG. 8.
Figure 10:
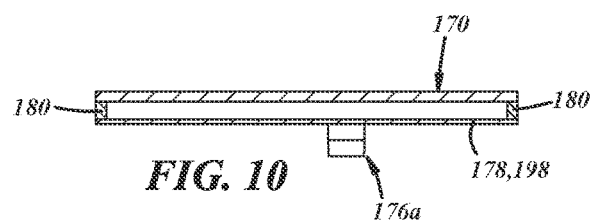
FIG. 10 is an enlarged cross-sectional view of the platform shown in FIG. 8, taken along line 10-10 of FIG. 9.

In the illustrated embodiment, and with reference to FIGS. 9 and 10, the fluid duct(s) 176a,b,c communicate with a space between the upper wall 170, the lower wall 178 beneath the upper wall 170, and side walls 180 and end walls 181 extending therebetween. The walls 170, 178, 180, 181 may be welded together in an airtight manner. Preferably, the upper wall 170 is welded to the side walls 180 and then the lower wall 178 is welded to the side walls 180. As also shown in FIG. 10, the fluid duct(s) 176a,b,c may be laterally offset from a longitudinally extending centerline of the sluice 156 to accommodate various structural elements of the vibratory equipment.

With reference to FIG. 9, the plurality of fluid ducts 176a,b,c beneath the upper wall 170 of the platform 160 can communicate fluid to the plurality of apertures 174 according to a plurality of different parameter values. For example, an upstream fluid duct 176a may be supplied with a fluid at a first pressure and flow rate, a downstream fluid duct 176c may be supplied with a fluid at a second pressure and flow rate, and so on. Likewise, in this regard, the apertures 174 corresponding to any given fluid duct of the plurality of fluid ducts 176a,b,c may be different in quantity and/or size to convey fluid according to different parameter values. The apertures 174 may be 1 mm to 5 mm in diameter including all ranges, sub-ranges, values, and endpoints of that range. The apertures 174 may be arranged in a rectangular array, as illustrated, or in any other suitable arrangement, and may be spaced apart from one another in longitudinal and lateral directions by 25 mm to 75 mm including all ranges, sub-ranges, values, and endpoints of that range. From the present disclosure, those of ordinary skill in the art would recognize that size, quantity, spacing, and configuration, of the apertures 174 and air pressure through the apertures 174 may be adjusted merely to achieve a fundamental minimum air velocity to provide enough force to lift glass off the surface like an air hockey puck, and such parameters may be depend on a mode of operation (receiving and conveying streams of molten glass or individual gobs of molten glass), and estimated weight of the glass.

With reference to FIG. 5, the fluid supplied to the platform 160 of the sluice 156 may be a gas or a liquid, for example, air or water, but can be any fluid suitable for use in cooling and/or conveying glass. Preferably, however, no cooling liquid is used, such that neither the bottom wall 198 of the inlet 162 nor the rest of the lower wall 178 need be liquid-cooled. The platform 160 may be composed of AISI 1018, 1020, 1065, and/or any other suitable carbon steel, 304 stainless steel, Inconel 601, and/or any other suitable metal, and/or any other material suitable for use with molten glass. Likewise, although the sluice 156 may be configured to receive process water with the molten glass, preferably the sluice 156 operates on a waterless basis such that it does not receive process water with the molten glass and, instead, receives "dry" molten glass and conveys the dry molten glass downstream. Accordingly, the sluice 156 may be waterless in one or more respects. Although not separately illustrated, those of ordinary skill in the art would recognize that the sluice 156 may be supplied with fluid using conduit, connectors, fans, pumps, controllers, valves, power supplies, and/or any other equipment suitable for use in supplying fluid to the sluice 156. Likewise, although not separately illustrated, those of ordinary skill in the art would recognize that the vibrators 66 may be supplied with electricity, or pneumatic or hydraulic fluid, via wiring, conduit, controllers, valves, and/or any other equipment suitable for use in supplying power and control to the vibrators 66.

The upstream inlet 162 includes inlet side walls 192 on opposite lateral sides, an inlet front wall 194 extending between the side walls 192 at downstream ends of the side walls 192, and an inlet rear wall 196 that may have an upper edge that is vertically recessed from corresponding upper edges of the side walls 192 and front wall 194. The inlet rear wall 196 may be shorter than the side walls 192, for example, to accommodate a molten glass chute (not shown) cooperating with the sluice 156 to deliver molten glass to the inlet 162. The inlet 162 also includes a bottom wall 198 extending between the side walls 192 and supporting the platform 160 thereon, and a top wall 200 extending between the side walls 192 and forward from the front wall 194. The top wall 200 has an aperture 202 that may be configured to be coupled to steam removal conduit and a corresponding pump, fan, and/or any other equipment (not shown) suitable to pull air and steam out of the sluice 156.

The base 158 may include a rectangular frame that may include four or more legs or pedestals 204 at each corner of the base 158, longitudinally extending side rails 206 extending between the pedestals 204, and laterally extending end rails 208 extending between the pedestals 204.

Finally, the sluice 156 may be equipped with one or more sensors 209, for example, proximate the outlet 164 of the sluice 156 to sense presence of glass, temperature of the glass, and/or any other characteristics suitable for use as feedback in adjusting performance characteristics of the sluice 156 such as air flow, air pressure, vibration frequency, vibration intensity, and/or the like. For example, the sensor(s) 209 may include an IFM TW2000 infrared sensor to measure temperature of the glass as it exits the sluice 156. Those of ordinary skill in the art would recognize that the sensor(s) 209 can be coupled to any suitable controllers, which, in turn, may be coupled to the vibrators, fans, pumps, power supplies, and/or any other equipment used to operate the sluice 156 and which may be coupled to and controlled by such controllers.

Figure 11:
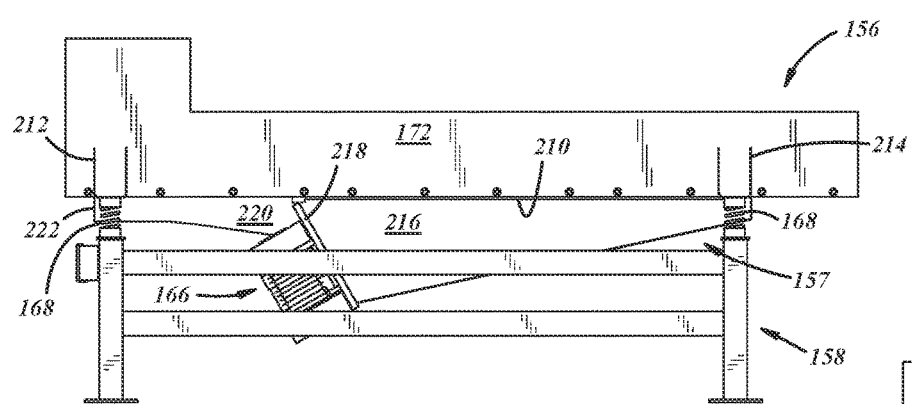
FIG. 11 is a side view of the sluice, cradle, and platform of FIG. 5.
Figure 12:
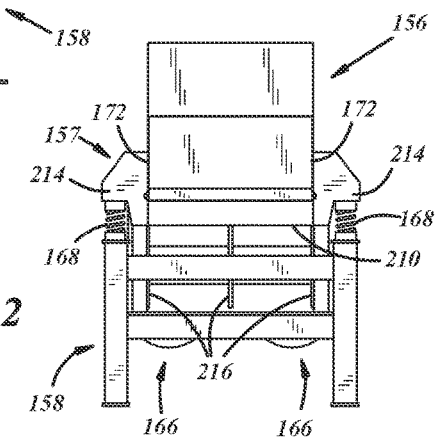
FIG. 12 is a front end view of the sluice, cradle, and platform of FIG. 5.
Figure 13:
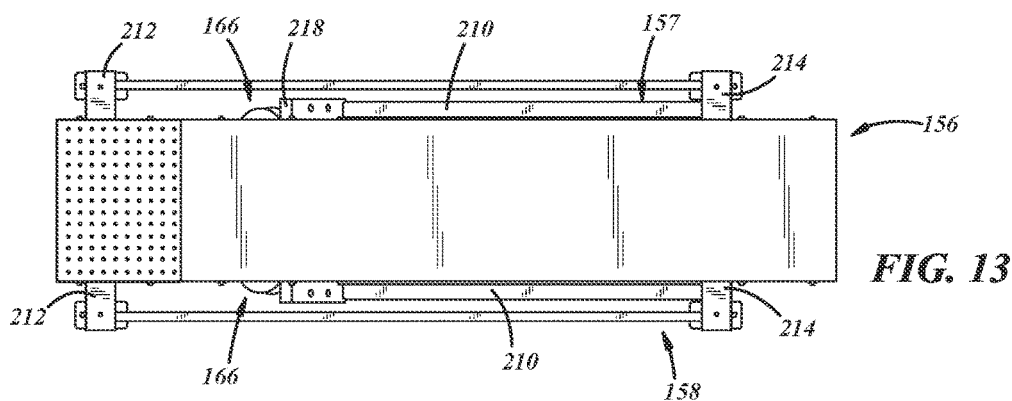
FIG. 13 is a top view of the sluice, cradle, and platform of FIG. 5.

With reference to FIGS. 11-13, the cradle 157 is carried by the base 158 and, in turn, carries the sluice 156. The cradle 157 includes a base wall 210, rear flanges 212 extending laterally outwardly from the base wall 210 at a rear end of the cradle 157, and front flanges 214 extending laterally outwardly from the base wall 210 at a front end of the cradle 157. The flanges 212, 214 may extend upwardly along the sidewalls 172 of the sluice 156 to laterally restrain the sluice 156 and may be welded, fastened, or otherwise coupled thereto. Also, the flanges 212, 214 may be welded, fastened, or otherwise coupled onto the isolators 168. The cradle 157 also includes one or more webs 216 (FIGS. 11 and 12) extending downwardly from and longitudinally along the base wall 210 and may be welded, fastened, or otherwise coupled thereto.

Figure 14:
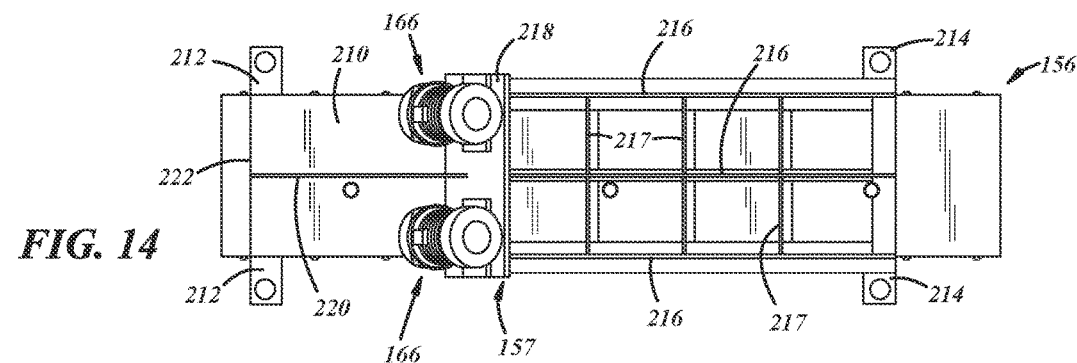
FIG. 14 is a bottom view of the sluice, cradle, and platform of FIG. 5.

As best shown in FIG. 14, the cradle 157 further includes one or more cross-members 217 that extends laterally between the webs 216 and that may be welded, fastened, or otherwise coupled thereto. In the illustrated embodiment, there are three webs 216; one centrally located and two on lateral outboard sides of the centrally located one. The cradle 157 further includes a vibrator mounting plate 218 that may be welded, fastened, or otherwise coupled to upstream ends of the webs 216 for mounting the vibrators 166 thereto, and a reinforcement strut 220 that may be welded, fastened, or otherwise coupled to the base wall 210, and to the vibrator mounting plate 218 and extending upstream therefrom to a rear wall 222, which may be welded, fastened, or otherwise coupled to and extending downwardly from the base wall 210 at the rear end of the cradle 157. Of course, the vibrators 166 may be fastened, welded, or otherwise coupled to the mounting plate 218 in any suitable manner.

Although the illustrated embodiment shows the sluice 156 supported by the base 158 resting on a factory floor, in other embodiments, the sluice 156 may be suspended from overhead, for example, from girders, trusses, and/or any other suitable overhead structure of a building in which the sluice 156 is used. In such embodiments, suitable tie rods, cables, and/or the like, along with corresponding fasteners, brackets, and/or the like may be used to coupled the cradle 157 to such building overhead structure. Likewise, the vibration isolators 168 may be configured to be coupled between such overhead structure and the cradle 157 in any suitable manner.

The sluice 156 and its ancillary equipment like the sensor(s) 209, a fluid fan or pump to supply fluid through the apertures 174, and the vibrators 166 may be instrumented and/or communicated with one or more controllers for closed loop control of rate of flow of molten glass through the sluice 156. For instance, a temperature of the glass can be sensed or monitored by one or more of the sensors 209, for example, at or proximate the end of the platform 160 as it exits the sluice 156. In response to such glass temperature sensing, when the glass temperature is determined to be in excess of some temperature threshold, and in one example, the vibration energy can be decreased to slow the glass flow rate across or along the platform thereby allowing more time for the glass to cool down more, and/or, in another example, air pressure supplied through the apertures 174 can be increased to increase cooling of the glass.

Figure 15:
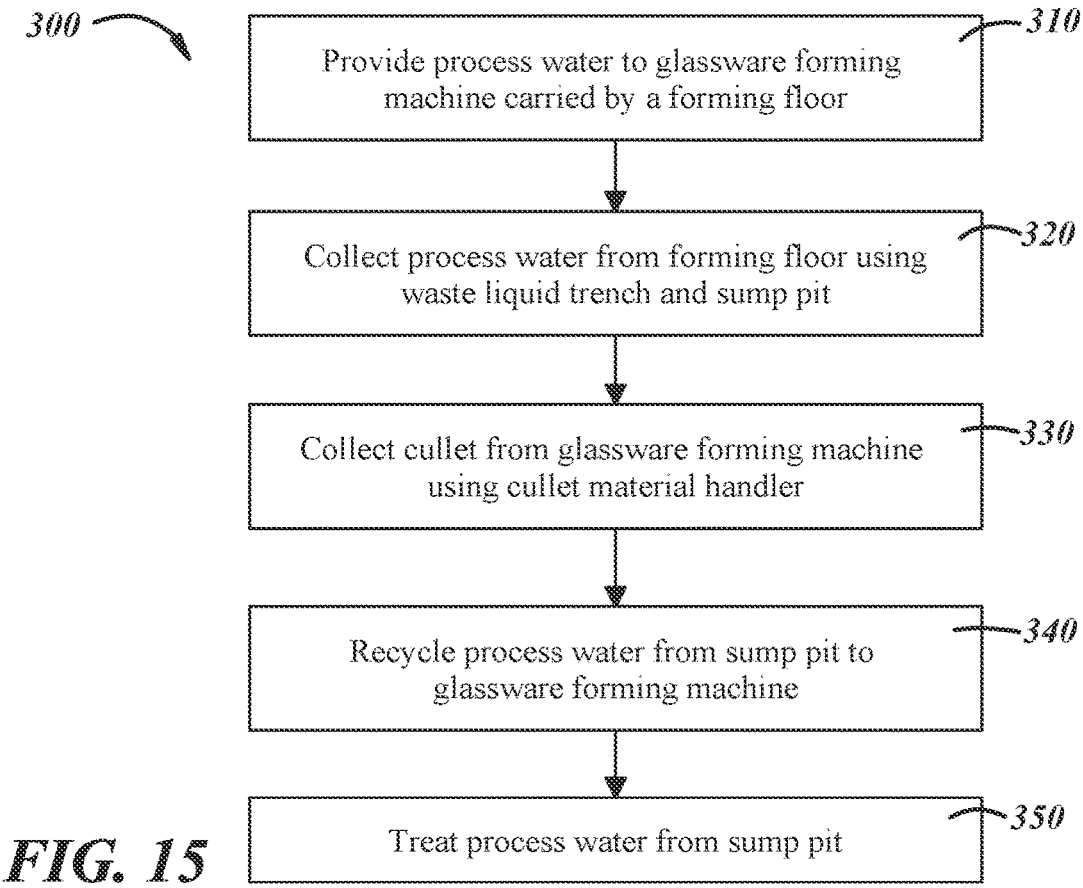
FIG. 15 is a flow diagram showing various steps of an illustrative embodiment of a method for using the glassware manufacturing system, the glassware manufacturing waste handling system, and the components thereof shown in FIGS. 1 through 14.

FIG. 15 illustrates an example of a method 300 for handling glassware manufacturing waste using the glassware manufacturing system 10 and glassware manufacturing waste handling system 12 described herein. For purposes of illustration and clarity, method 300 will be described in the context of the glassware manufacturing system 10 described above and generally illustrated in FIGS. 1 through 14. It will be appreciated, however, that the application of the present methodology is not meant to be limited solely to such an arrangement, but rather method 300 may find application with any number of arrangements (i.e., steps of method 300 may be performed by components of the glassware manufacturing system 10 other than those described below, or arrangements of the glassware manufacturing system 10 other than that described above).

Method 300 comprises a step 310 of providing process water to the glassware forming machine 16 carried by the forming floor 18, where the process water drains from the glassware forming machine 16 to the forming floor 18. In the context of this disclosure, providing process water may include providing plant water, cullet water, shear spray water, cooling water to the waste molten glass chute 34, and/or any other liquid to the glassware forming machine 16. In an example, process water can be provided to the glassware forming machine 16 by way of spray nozzles or other devices for use as shear water (e.g., to cool shears), cooling water (e.g., to cool the waste molten glass chute 34), and so forth. The process water can be provided to the glassware forming machine 16 and can then drain by gravity from the glassware forming machine 16 to the forming floor 18. In some instances, the provided process water can be recycled from water previously used in a glassware manufacturing process, and may be treated and recycled from the sump pit 28.

Method 300 comprises a step 320 of collecting the process water from the forming floor 16 using a waste liquid trench 22 and a sump pit 28 formed in the forming floor 16. After the process water drains from the glassware forming machine 16 to the forming floor 18, the water can flow to the waste liquid trench 22. In instances when the forming floor 16 has a pitch or is sloped or crowned, the pitch, slope or crown of the forming floor 16 can assist with providing and directing the process water flow. As the water flows to and is collected by the water liquid trench 22, the water liquid trench 22 can carry and direct the water to the sump pit 28, where the water can be collected and contained for treatment, further use and recycling, and/or disposal. In some instances, collecting the water can include collecting the water from other equipment in addition to the glassware forming machine 16, for example the cullet material handler 30.

Method 300 comprises a step 330 of collecting cullet from the glassware forming machine 16. In one embodiment, the method includes using the cullet material handler 30 to collect the cullet, where the cullet material handler 30 is disposed adjacent, or proximate, to the glassware forming machine 16. The cullet can be provided to the cullet material handler 30 using the waste molten glass chute 34, a reject conveyor 36, and/or other equipment used in the industry for handling cullet. In another embodiment, the method also or instead includes using the sluice 56, 156 to collect the cullet, where the sluice 56, 156 is disposed adjacent, or proximate, to the glassware forming machine 16. The cullet can be provided to the sluice 56, 156 using the waste molten glass chute 34, a reject conveyor 36, and/or other equipment used in the industry for handling cullet.

Method 300 comprises a step 340 of recycling the process water from the sump pit 28 to the glassware forming machine 16. In this step, the water in the sump pit 28 can be pumped/provided to the glassware forming machine 16 using a pump (not shown) or other means. For example, the water can be pumped through plumbing to the glassware forming machine 16 including at least one spray nozzle. In some implementations, additional water can be added to the process water for compensating for process water losses, for example due to evaporation. In this way, the glassware manufacturing system 10 can be generally a closed loop with regard to providing the recycled process water.

In some instances, method 300 may comprise a step 350 of treating the process water from the sump pit 28. Process water collected by the sump pit 28 may include materials and/or debris (e.g., oil, dirt, small glass pieces, suspended solids, and the like) from the glassware forming process that may be undesirable. In these cases, the collected process water may be treated so that cleaner water may be recycled to the glassware forming machine 16. For example, the sump pit 28 may include an API oil-water separator. Treating the process water with an API oil-water separator can include separating gross amounts of oil and/or suspended solids from the collected water. Other methods for treating the process water may include filtration using a filter. It is contemplated that the water collected by the sump pit 28 may be treated using other equipment and processes.

Figure 16:
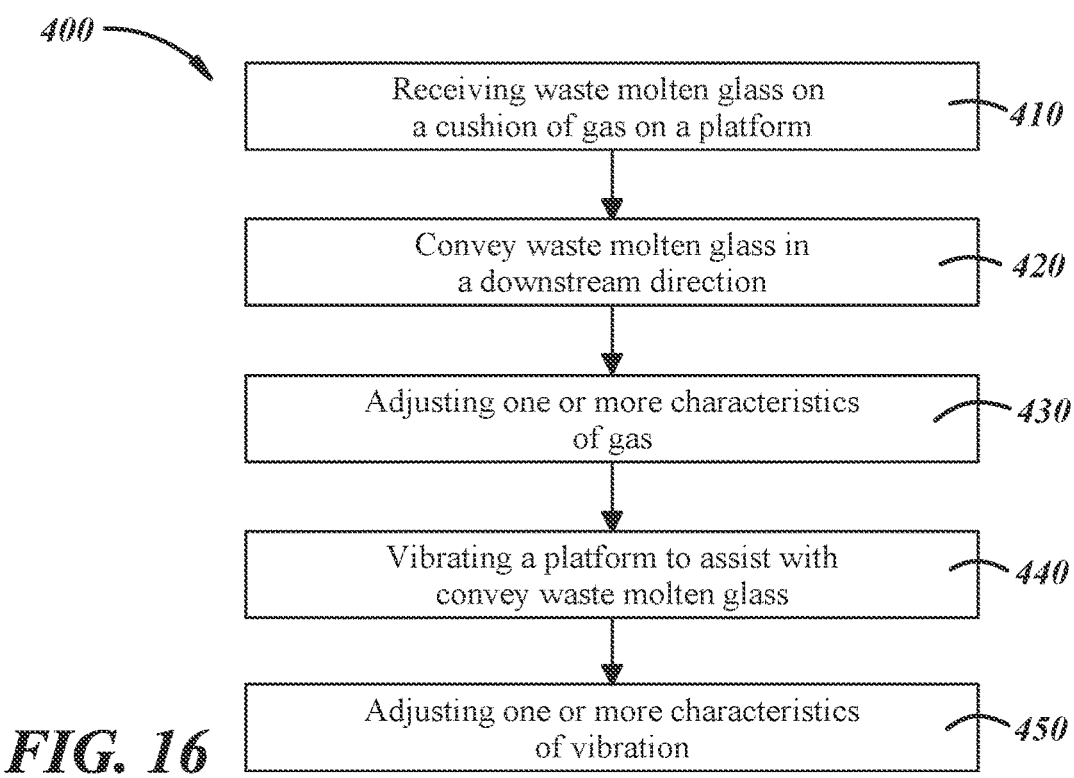
FIG. 16 is a flow diagram showing various steps of another illustrative embodiment of a method and for using the glassware manufacturing system, the glassware manufacturing waste handling system, and the components thereof shown in FIGS. 1 through 14.

FIG. 16 illustrates an example of a method 400 for handling waste molten glass using the sluices 56, 156 and their ancillary equipment described herein. For purposes of illustration and clarity, method 400 will be described in the context of the sluices 56, 156 generally illustrated in FIGS. 4-14. It will be appreciated, however, that the application of the present methodology is not meant to be limited solely to such an arrangement, but rather method 400 may find application with any number of arrangements (i.e., steps of method 400 may be performed by components of the sluices 56, 156 and ancillary equipment other than those described below, or arrangements of the sluices 56, 156 and ancillary equipment other than that described above).

Method 400 comprises a step 410 of receiving waste molten glass on a cushion of gas on a platform. For example, discrete gobs or charges of waste molten glass, or streams of waste molten glass may be received on cushions of gas supplied by the platforms 60, 160 illustrated in FIGS. 4 and 5, or on any other platform suitable to have a cushion of gas thereon and to receive molten glass thereon.

Method 400 also comprises a step 420 of conveying waste molten glass in a downstream direction on a cushion of gas on a platform. For example, the platforms 60, 160 may be declined along a downstream direction, and the cushion of gas may be configured to push the molten glass in a downstream direction.

Method 400 further comprises a step 430 of adjusting one or more characteristics of gas to affect a flow of waste molten glass along a platform. For example, the gas can be supplied at an upstream end of the platforms 60, 160 at a higher pressure and/or flow rate compared to gas supplied at a downstream end of the platforms 60, 160.

Method 400 also comprises a step 440 of vibrating a platform to assist with conveying waste molten glass in a downstream direction. For example, the platforms 60, 160 may be coupled to the one or more vibrators 66, 166 to produce relative movement in an lateral and/or longitudinal direction between an upper surface of the platforms 60, 160 and a lower surface of the molten glass.

Method 400 additionally comprises a step 450 of adjusting one or more characteristics of vibration of step 440 to affect a flow of waste molten glass along a platform. For instance, a temperature of the glass can be sensed or monitored by one or more of the sensors 209, for example, at or proximate the end of the platform 160 as it exits the sluice 156. In response to such glass temperature sensing, when the glass temperature is determined to be in excess of some temperature threshold, and in one example, the vibration energy can be decreased to slow the glass flow rate across or along the platform thereby allowing more time for the glass to cool down more, and/or, in another example, air pressure supplied through the apertures 174 can be increased to increase cooling of the glass.

The presently disclosed equipment and/or methods may facilitate reception and conveying of hot molten glass in a manner that may eliminate the need for a basement, may be compact, may be waterless, and/or may reduce or eliminate chute-clogging of waste glass.

Figure 17:
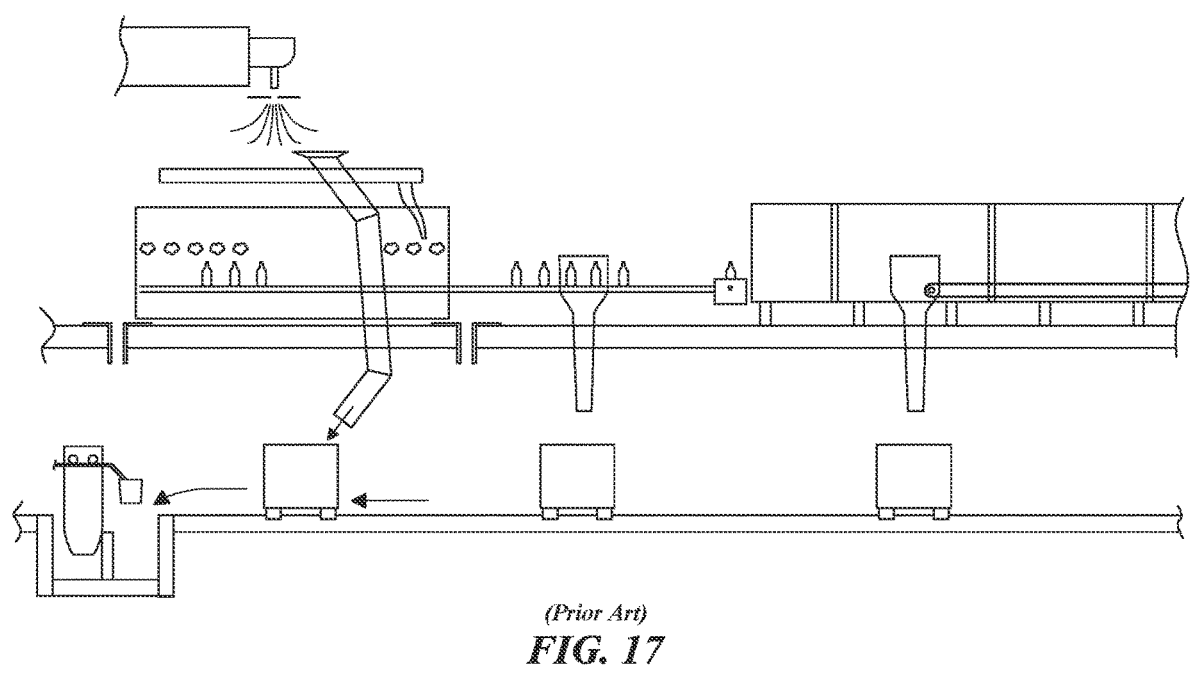
FIG. 17 is a glassware manufacturing system according to the prior art.

FIG. 17 illustrates a prior art glassware manufacturing system, including an architectural installation having a forming floor and abasement beneath the forming floor. A glassware forming machine is carried on the forming floor, and an annealing lehr is carried on the forming floor downstream of the forming machine. A forehearth is located above the forming machine and is coupled to a molten glass feeder configured to provide glass gobs to the glassware forming machine. A glassware manufacturing waste handling system includes a hot gob chute extending from the feeder, through the forming floor, and into a gondola in the basement, and a shear spray collection pan for dumping shear spray into the basement via the hot gob chute or otherwise. The waste handling system also includes a hot cullet return chute extending from a hot container conveyor, through the forming floor, and into a gondola in the basement, and a cold cullet return chute extending from a cold container conveyor, through the forming floor, and into another gondola in the basement. The waste handling system also includes floor drains extending from an upper surface of the forming floor to the basement for draining waste liquids onto the basement floor and into an American Petroleum Institute (API) pit for oil/water separation.

There thus has been disclosed a glassware manufacturing system, a glassware manufacturing waste handling system, and a method for containing and recycling process water and limiting cullet handling to the forming floor. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A glassware manufacturing system, comprising:
    an architectural installation having a forming floor and no basement beneath the forming floor;
    a glassware forming machine carried on the forming floor;
    a molten glass feeder configured to provide molten glass to the glassware forming machine; and
    a glassware manufacturing waste handling system, including:

a sump pit in the forming floor;
a waste liquid trench substantially surrounding the glassware forming machine and flowing to the sump pit; and
at least one of a cullet material handler or a molten waste glass sluice, configured to receive molten glass from the molten glass feeder and hot glassware rejects from the glassware forming machine.

2. The system of claim 1, wherein the forming floor is sloped or crowned from the glassware forming machine to the waste liquid trench.

3. The system of claim 1, wherein the glassware forming machine is an individual section machine.

4. The system of claim 1, wherein the cullet material handler and/or the molten waste glass sluice is at least partially recessed in a cullet trench in the forming floor.

5. The system of claim 4, further comprising:
an enclosure over the cullet trench to establish a cullet trench conduit; and
steam removal ductwork in fluid communication with the cullet trench conduit to remove steam from the cullet trench conduit.

6. The system of claim 1, wherein the cullet material handler and/or the molten waste glass sluice is mounted to the forming floor and disposed at a level of the forming floor.

7. The system of claim 1, wherein the cullet material handler includes a steel-hinged drag chain.

8. The system of claim 1, wherein liquid waste collected by the sump pit is recycled to the system.

9. The system of claim 1, further comprising:
an annealing lehr downstream of the glassware forming machine.

10. The system of claim 9, further comprising:
a cold cullet return conveyor on the forming floor configured to receive cold glassware rejects from a location downstream of the annealing lehr.

11. The system of claim 10, further comprising:
a reject conveyor configured to transport the hot glassware rejects from the glassware forming machine to the cullet material handler.

12. The system of claim 11, further comprising:
a cullet crusher on the forming floor.

13. The system of claim 12, wherein the cullet crusher is disposed between the cullet material handler and a cold cullet return conveyor to produce cullet from the cold glassware rejects and direct the cullet to the cullet material handler and/or the molten waste glass sluice.

14. The system of claim 13, further comprising:
a waste molten glass chute configured to direct rejected mold charges from the glassware forming machine to the cullet material handler and/or the molten waste glass sluice.

15. The system of claim 11, wherein the reject conveyor includes high temperature plating.

16. The system of claim 1, further comprising:
an annealing lehr downstream of the glassware forming machine;
a cold cullet return conveyor on the forming floor and configured to receive cold glassware rejects from a location downstream of the annealing lehr; and
a cullet crusher disposed between the cullet material handler and a cold cullet return conveyor to produce cullet from the cold glassware rejects and direct the cullet to the cullet material handler and/or the molten waste glass sluice.

17. The system of claim 1, further comprising:
a reject conveyor configured to transport the hot glassware rejects from the glassware forming machine to the cullet material handler; and
a waste molten glass chute configured to direct rejected mold charges from the glassware forming machine to the cullet material handler and/or the molten waste glass sluice.

18. The system of claim 1, further comprising:
an annealing lehr downstream of the glassware forming machine;
a cold cullet return conveyor on the forming floor and configured to receive cold glassware rejects from a location downstream of the annealing lehr;
a cullet crusher disposed between the cullet material handler and a cold cullet return conveyor to produce cullet from the cold glassware rejects and direct the cullet to the cullet material handler and/or the molten waste glass sluice;
a reject conveyor configured to transport the hot glassware rejects from the glassware forming machine to the cullet material handler; and
a waste molten glass chute configured to direct rejected mold charges from the glassware forming machine to the cullet material handler and/or the molten waste glass sluice.

19. A glassware manufacturing waste handling system, comprising:
a sump pit in a forming floor of an architectural installation, where the architectural installation has no basement beneath the forming floor;
a waste liquid trench in the forming floor and substantially surrounding a glassware forming machine carried on the forming floor, the waste liquid trench flowing to the sump pit; and
at least one of a cullet material handler or a molten waste glass sluice, configured to receive molten glass from a molten glass feeder and hot glassware rejects from the glassware forming machine.

20. The system of claim 19, wherein the forming floor is sloped from the glassware forming machine to the waste liquid trench.

21. The system of claim 19, wherein liquid waste collected by the sump pit is recycled to a glassware manufacturing system.

22. The system of claim 19, wherein the forming floor is sloped or crowned from the glassware forming machine to the waste liquid trench.

23. The system of claim 19, wherein the cullet material handler and/or the molten waste glass sluice is at least partially recessed in a cullet trench in the forming floor.

24. The system of claim 23, further comprising:
an enclosure over the cullet trench to establish a cullet trench conduit; and
steam removal ductwork in fluid communication with the cullet trench conduit to remove steam from the cullet trench conduit.

25. The system of claim 19, wherein the cullet material handler and/or the molten waste glass sluice is mounted to the forming floor and disposed at a level of the forming floor.

26. A glassware manufacturing system, comprising:
an architectural installation having a forming floor;
a glassware forming machine carried on the forming floor;
a molten glass feeder configured to provide molten glass to the glassware forming machine; and a glassware manufacturing waste handling system, including:
- a sump pit in the forming floor;
- a waste liquid trench in the forming floor and substantially surrounding the glassware forming machine and flowing to the sump pit; and
- a cullet material handler configured to receive hot glassware rejects from the glassware forming machine.

27. The system of claim 26, wherein the glassware manufacturing waste handling system also includes:
- a molten waste glass sluice configured to receive molten glass from the molten glass feeder.

28. The system of claim 27, wherein the glassware manufacturing waste handling system also includes:
- a waste molten glass chute configured to direct rejected mold charges from at least one of the glassware forming machine or the molten glass feeder to the molten waste glass sluice.

29. The system of claim 26, wherein the glassware manufacturing waste handling system also includes:
- a waste molten glass chute configured to direct rejected mold charges from at least one of the glassware forming machine or the molten glass feeder to the cullet material handler.

30. The system of claim 29, wherein the glassware manufacturing waste handling system also includes:
- a reject conveyor configured to transport the hot glassware rejects from the glassware forming machine to the cullet material handler.

31. The system of claim 26, further comprising:
- an annealing lehr downstream of the glassware forming machine;

wherein the glassware manufacturing waste handling system also includes:
- a cold cullet return conveyor on the forming floor and configured to receive cold glassware rejects from a location downstream of the annealing lehr; and
- a cullet crusher disposed between the cullet material handler and a cold cullet return conveyor to produce cullet from the cold glassware rejects and direct the cullet to the cullet material handler.

32. A glassware manufacturing system, comprising:
an architectural installation having a forming floor,
a glassware forming machine carried on the forming floor;
a molten glass feeder configured to provide molten glass to the glassware forming machine; and
a glassware manufacturing waste handling system, including:
- a sump pit in the forming floor;
- a waste liquid trench in the forming floor and substantially surrounding the glassware forming machine and flowing to the sump pit; and
- a molten waste glass sluice configured to receive molten glass from the molten glass feeder.

33. The system of claim 32, wherein the glassware manufacturing waste handling system also includes:
- a waste molten glass chute configured to direct rejected mold charges from at least one of the glassware forming machine or the molten glass feeder to the molten waste glass sluice.

34. The system of claim 33, wherein the glassware manufacturing waste handling system also includes:
- a cullet material handler configured to receive hot glassware rejects from the glassware forming machine.

* * * * *